(12) United States Patent
Lemay (10) Patent No.: US 8,763,778 B2
(45) Date of Patent: Jul. 1, 2014

(54) BEARING CASING ASSEMBLY FOR CONVEYOR ROLLERS AND CONVEYOR ROLLER ASSEMBLY

(75) Inventor: Patrick Lemay, Quebec (CA)

(73) Assignee: UDI Equipment Inc. (CA)

( * ) Notice: Subject to any disclaimer, the term of this patent is extended or adjusted under 35 U.S.C. 154(b) by 0 days.

(21) Appl. No.: 13/510,745

(22) PCT Filed: Nov. 23, 2010

(86) PCT No.: PCT/CA2010/001832
§ 371 (c)(1),
(2), (4) Date: Jul. 13, 2012

(87) PCT Pub. No.: WO2011/063504
PCT Pub. Date: Jun. 3, 2011

(65) Prior Publication Data
US 2012/0267213 A1    Oct. 25, 2012

Related U.S. Application Data (60) Provisional application No. 61/264,054, filed on Nov. 24, 2009.

(51) Int. Cl.
*B65G 39/09* (2006.01)

(52) U.S. Cl.
CPC ..................................... *B65G 39/09* (2013.01)
USPC ............................................. 193/37; 492/47

(58) Field of Classification Search
USPC .................................. 193/37; 492/47; 384/480
See application file for complete search history.

(56) References Cited

U.S. PATENT DOCUMENTS

| | | | |
|---|---|---|---|
| 5,025,917 A * | 6/1991 | Smith et al. | 198/842 |
| 5,433,308 A | 7/1995 | Gagnon | |
| 6,053,298 A * | 4/2000 | Nimmo et al. | 193/37 |
| 6,082,528 A | 7/2000 | Habberley | |
| 6,113,059 A | 9/2000 | Couillard | |
| 6,454,077 B2 * | 9/2002 | Nimmo et al. | 193/37 |
| 6,516,942 B2 | 2/2003 | East | |
| 6,808,063 B2 | 10/2004 | Itoh et al. | |
| 2005/0217967 A1 | 10/2005 | Scott | |
| 2006/0147141 A1 * | 7/2006 | Harwood et al. | 384/480 |
| 2009/0169146 A1 * | 7/2009 | Gagnon | 384/462 |
| 2009/0321216 A1 * | 12/2009 | Weichbrodt | 193/37 |
| 2011/0168520 A1 * | 7/2011 | Gagnon | 193/37 |

FOREIGN PATENT DOCUMENTS

| | | |
|---|---|---|
| CA | 2440193 | 9/2002 |
| WO | 2009109030 | 9/2009 |

* cited by examiner

*Primary Examiner* — Mark A Deuble
(74) *Attorney, Agent, or Firm* — McCormick, Paulding & Huber LLP (57) ABSTRACT

A bearing casing assembly for a conveyor roller tube having a casing, a stub axle, bearings, an outer seal member and shield cap, is provided. The casing includes a body having a shoulder at its distal end extending circumferentially and radially outwardly for abutting against an end of the roller tube, an inner flange extending circumferentially and radially inwardly near the distal end from the casing body and an internally threaded a proximal end. The casing also includes a casing seat having a threaded portion for threadingly engaging the threaded proximal end portion of the casing body and a bearing engaging portion adapted to abut the bearing for selectively adjusting a preload on the bearing by rotating the casing seat about the casing body. The bearing casing assembly may further include an inner seal member when fluid lubricating bearings are used.

25 Claims, 10 Drawing Sheets

BEARING CASING ASSEMBLY FOR CONVEYOR ROLLERS AND CONVEYOR ROLLER ASSEMBLY

FIELD OF THE INVENTION

The present invention pertains to the field of conveyor rollers and in particular, to a conveyor roller assembly and a bearing casing assembly for conveyor rollers.

BACKGROUND OF THE INVENTION

Conveyor systems utilizing rollers, also known as idlers, are widely used in a variety of industrial and commercial applications to transport materials. In these environments rollers can be subjected to harsh conditions and considerable use which can cause the rollers to deteriorate rapidly and/or fail prematurely. This is particularly significant since roller failure can cause the shutdown of the conveyor as well as damage to the other components of the conveyor.

Conveyor rollers currently known in the art have problems with such things as establishing an effective seal against contaminants entering the bearings, bearing end play and preload adjustment, shaft and bearing alignment and bearing lubrication. They can also be awkward to handle, very expensive to manufacture and maintenance can often be difficult. There is, therefore, a need for improved conveyor rollers especially for use in industrial applications.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a bearing casing assembly for a conveyor roller tube in a conveyor roller assembly. In accordance with an aspect of the present invention, there is provided a bearing casing assembly for a conveyor roller tube comprising a) a casing adapted to be inserted at least in part into an end of a conveyor roller tube, the casing comprising a casing body and a casing seat, the casing body comprising a shoulder at the distal end of thereof extending circumferentially and radially outwardly for abutting against an end of the roller tube, an inner flange extending circumferentially and radially inwardly near the distal end from the casing body and an internally threaded a proximal end, the casing seat comprising a threaded portion for threadingly engaging the threaded proximal end portion of the casing body and a bearing engaging portion adapted to abut the bearing for selectively adjusting a preload on the bearing by rotating the casing seat about the casing body, b) a stub axle positioned within said casing and comprising a tip projecting outwardly from said casing distal end, c) a pair of bearings mounted in a spaced apart relationship on said axle such that the axle is rotatable with respect to the casing, d) an outer seal member coupled to the axle extending circumferentially and radially outward toward the casing body, the outer seal member comprising labyrinth seal elements on the upper and lower surfaces thereof, the lower labyrinth seal elements of the outer seal member rotatably engaging labyrinth seal elements of the upper surface of the inner flange to form a first labyrinth seal, and e) a shield cap adapted to be coupled to the inner surface of the casing body at the distal end thereof, the shield cap comprising labyrinth seal elements to engage the labyrinth seal elements of the outer surface of the inner flange to form a second labyrinth seal.

In accordance with another aspect of the invention, there is provided a conveyor roller assembly comprising a roller tube and a pair of bearing casing assemblies adapted to be inserted at least in part within opposite ends of the roller tube.

BRIEF DESCRIPTION OF THE FIGURES

Embodiments of the present invention will now be described, by way of example only, by reference to the attached Figures, wherein.

DETAILED DESCRIPTION OF THE INVENTION

Unless defined otherwise, all technical and scientific terms used herein have the same meaning as commonly understood by one of ordinary skill in the art to which this invention belongs.

Bearing Casing Assembly

The reference numeral 20 in FIG. 1 to 11 generally denotes a bearing casing assembly. The bearing casing assembly 20 generally comprises a casing, a stub axle 46, a pair of bearings (50, 52), an outer seal member 62 and shield cap 68.

The bearing casing assembly 20 may be provided in various sizes depending on the size of the conveyor rollers. The bearing casing assembly 20 is configured to be inserted at least in part within an open end of a roller tube. The bearing casing assembly 20 may be pre-assembled as a bearing cartridge that can easily be secured in the end of a roller tube. It may be may be press fit so as to become frictionally retained within the end of a roller tube or it can be retained with fastening means. The bearing casing assembly 20 may also be press-fitted within the end of a roller tube and further retained with fastening means.

Casing

The casing includes a casing body 26 and a casing seat 28. The casing may be made from metals such as carbon steel, stainless steel, aluminum or from a variety of plastic material such as nylon, fiberglass, polycarbonate, ABS, PBT and a mixture of nylon and fiberglass or any other appropriate material known in the art. The casing body 26 has an annular cylindrical shape and is sized to fit snugly within an open end of a roller tube. The proximal end 30 of the casing body 26 has internally threaded portion. At its distal end 32, the casing body 26 has a radially outwardly facing circumferential shoulder 34 to limit the inward position of the casing when inserted within the open end of a roller tube. The shoulder 34 has a width substantially equal to the wall thickness of a roller tube. Depending on the application, the wall thickness and the overall size of the roller tubes may vary. The width of the shoulder 34 will therefore vary depending on the wall thickness of the roller tube. The lower edge of the shoulder 34 is configured to axially abut with the end wall of a roller tube. Optionally, the outer circumference of the shoulder 34 comprises a plurality of coupling apertures 35 extending there through adapted to receive fasteners to secure the casing to a roller tube. The shoulder 34 also includes a rounded upper peripheral edge for ease of handling, for aesthetic appearance and to help reduce damages to a conveyor belt. The casing body also includes an inner flange 36 extending circumferentially and radially inwardly from the casing body near the distal end 32 thereof. The flange 36 comprises upper labyrinth seal elements 38 and one or more circular races 40 on its lower surface. The upper labyrinth seal elements 38 radially extend from the top surface of the inner flange 36. The one or more circular races 40 are configured to abut against the bearing 50 and bearing spacer 54 and will help preload the bearings and the axle. The number and size of the circular races 40 may vary depending on the size of bearings (50, 52).

The casing seat 28 includes a top wall 29 having an upper and lower surface, and an annular side wall 44 extending downwardly from the periphery of the top wall 29. The annular side wall 44 has a threaded portion at its outer surface for engaging the threaded proximal end portion 42 of the casing body 26. The top wall 29 comprises a plurality of circular races 43 on its upper surface for abutting the bearing 52 for selectively adjusting a preload on the bearings by rotating the casing seat 28 about the casing body. The circular races 43 will maintain a position preload and a constant preload pressure on the bearings (50, 52) and the stub axle 46. Setting an appropriate preload on the bearings is an important consideration in terms of the lifespan and proper operation of the bearings. The precise setting of the position of a stub axle in radial and axial directions is an important consideration to helps increase the rotating precision of a conveyor roller assembly.

In one embodiment, the top wall 29 comprises a singular raised area on its upper surface for abutting the bearing 52 for selectively adjusting a preload on the bearings.

Suitable locking pawls may be provided on the inner surface of the annular side wall 44 to enhance the locking effect to achieve the desired adjustment. A radially extending lip 80 is disposed at the proximal end of the annular side wall 44 of the casing seat 28. The radial lip 80 extends over the proximal end 30 of the casing body 26 to form a seal when the casing seat 28 is threaded into the casing body 26. The radial lip 80 may also have a tapered portion to facilitate entry of bearing casing assembly 20 into the end of a roller tube 12 having a similar radius to the casing seat 28. In its assembly, the casing seat 28 and casing body 26 provide a central cylindrical cavity to house bearings.

In one embodiment, the casing is proportioned to be press fitted at least in part into an end of a roller tube.

In one embodiment, the outer upper portion of the casing body 26 comprises a threaded portion adapted to engage with an internal threaded portion in the end of a roller tube so that the bearing casing assembly 20 can be retaining the casing without being press-fitted or without the use of fastening means. Optionally, fastening means could also be used to further secure the bearing casing assembly 20 within the end of a roller tube.

In one embodiment, the distal end 32 of the casing body 26 does not comprise a radially outwardly facing circumferential shoulder 34. When secured in the end of a roller tube, the entire casing is contained within the end of the roller and the upper portion of the casing is substantially flush with the outer surface of the end of the roller tube.

In one embodiment, the top wall 29 of the casing seat 28 comprises a central bore (not shown) to receive a single axle extending beyond the length of the roller tube instead of a stub axle.

An annular seal 74, such as an elastomeric O-ring seal, can be inserted within the groove of the radial lip 80 and the distal end of the annular side wall 44 to prevent fluids and contaminants from entering or exiting the casing. In order to prevent the passage of the lubricant through the threaded members (42, 44) a sealant and/or an adhesive, for example, an epoxy or silicone insulation, among other conventional sealing materials, could be applied to the threaded members (42, 44).

Axle

A stub axle 46 is axially positioned within the casing. The stub axle 46 includes an elongated cylindrical body portion having a tip 48 projecting outwardly from the distal end 32 of the casing to engage a mounting hole or slot in a conveyor frame (not shown) and a collar 47 having an upper bearing engagement surface and a lower bearing engagement surface.

The stub axle 46 can be formed from a variety of suitable materials such as steel, iron, stainless, alloy, plastic, aluminum or any other suitable material known in the art. The stub axle 46 may also be coated with any conventional corrosion protection coating. A zinc plating coating is preferably applied. The stub axle 46 can have variety of lengths and diameters. The stub axle 46 will typically have an outer diameter ranging from 10 millimeters to 70 millimeters, although stub axles having smaller or greater diameters could also be used for specific applications. The stub axle tip 48 may also be provided in a variety of shapes and sizes, such as a tapered shape rather than a straight cylindrical shape, as shown.

In one embodiment, instead of stub axles a single axle extending along the full length of the roller tube. The axle extends thru the central bores of the casings and out of the distal end of the casings on each side of the roller assembly.

Bearings

A pair of bearings (50, 52) is mounted in a spaced apart relationship on the stub axle 46 so that the stub axle 46 is rotatable with respect to the casing. It will be appreciated that the distance between the two bearings (50, 52) will affect the stability and operation of the roller assembly. The precise positions of each bearing (50, 52) along the stub axle 46 can be chosen in accordance with a specific usage or need by selecting a specific axle 46 and corresponding bearing casing assembly 20. Optionally, there may be more than two bearings within each bearing casing assembly 20.

Figure 10:
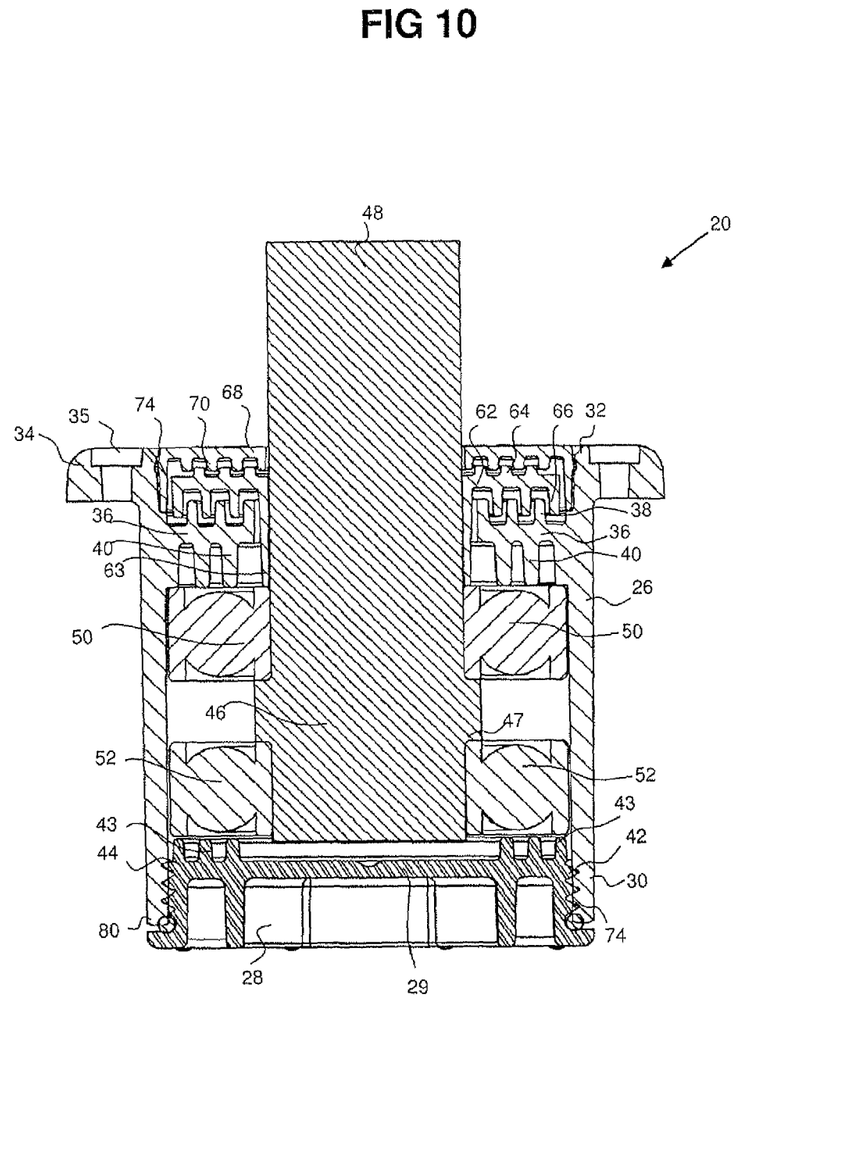
FIG. 10 is a cross-sectional view of the bearing casing assembly according to one embodiment of the present invention.
Figure 11:
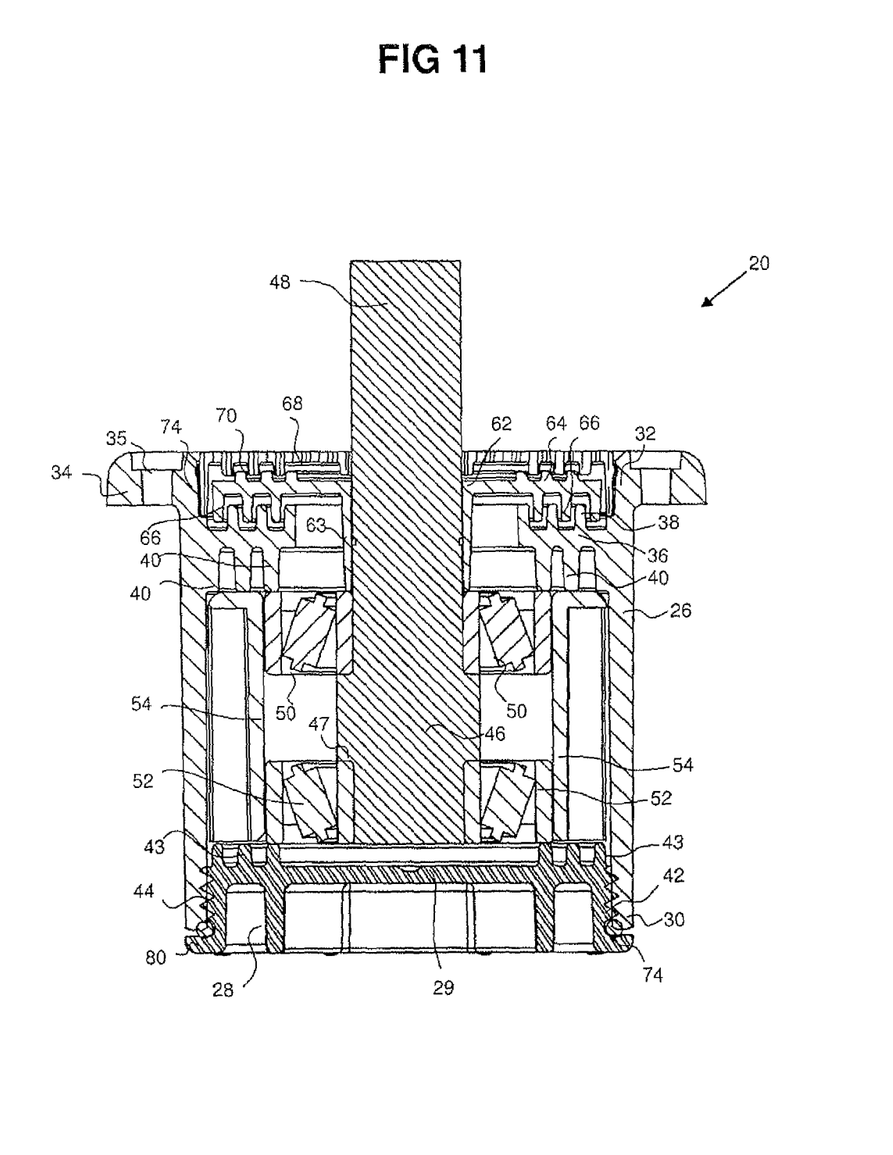
FIG. 11 is a cross-sectional view of the bearing casing assembly having bearing spacers and tapered roller bearings according to one embodiment of the present invention.

Each bearing (50, 52) includes an inner bearing race, an outer bearing race and a ring of balls secured there between in a known manner. While the bearings (50, 52) illustrated in FIGS. 2 to 5 and 7 to 10 are ball bearings, it will be appreciated that other types of bearings, such as needle, roller or tapered bearings could also be used as required. FIG. 10 shows an example of a bearing casing assembly 20 comprising tapered bearings. More broadly, the bearings (50, 52) should not be considered limited to rolling-element bearings and may also include bushings, journal bearings or other sleeve-type bearings. In addition, bearings (50, 52) of various sizes may be used. The specific size of the bearings (50, 52) is generally proportional to the size of the roller tube 12. The bearings (50, 52) will typically have an outer diameter ranging from 30 millimeters to 150 millimeters, although it will be appreciated that the bearings (50, 52) according to the present invention should not be considered limited thereto.

The inner bearing race of the bearing 50 abuts the upper bearing engagement surface of the collar 47 of the stub axle 46. The inner bearing race of the bearing 52 abuts the lower bearing engagement surface of the collar 47 of the stub axle 46. The inner bearing races of the bearings (50, 52) can also be press fit onto the outer portion of the stub axle 46. In one embodiment, the inner bearing races of the bearings (50, 52) are couple to the stub axle 46 by means of an appropriate industrial adhesive. By mounting axle stub 46 in two spaced-apart bearings (50, 52), the conveyor roller can bear significantly more weight than if only one bearing were used. It is also easier to ensure that the stub axle 46 is properly oriented in the bearing casing assembly 20.

Shield Cap

A shield cap 68 is coupled to the inner wall of the distal end of the casing body 26. The shield cap 68 is optionally made of nylon and comprises labyrinth seal elements 70 on its inner surface. The labyrinth seal elements 70 are axial circumferential projections that fit into the labyrinth seal elements 64 of the upper surface of the inner flange 62 to form a first labyrinth seal. The second labyrinth seal also acts to reduce the migration to contaminants to the central cylindrical cavity of the casing and the bearings (50, 52) disposed therein. The labyrinth seal elements (70, 64) are axial circumferential projections. The gaps formed in the first labyrinth seal are filled with a sealing means to help reduce outside contaminants. The sealing means may be grease, gel or some combination thereof.

The two labyrinth seals improve the isolation of the bearings from the surrounding atmosphere.

Outer Seal Member

Figure 1:
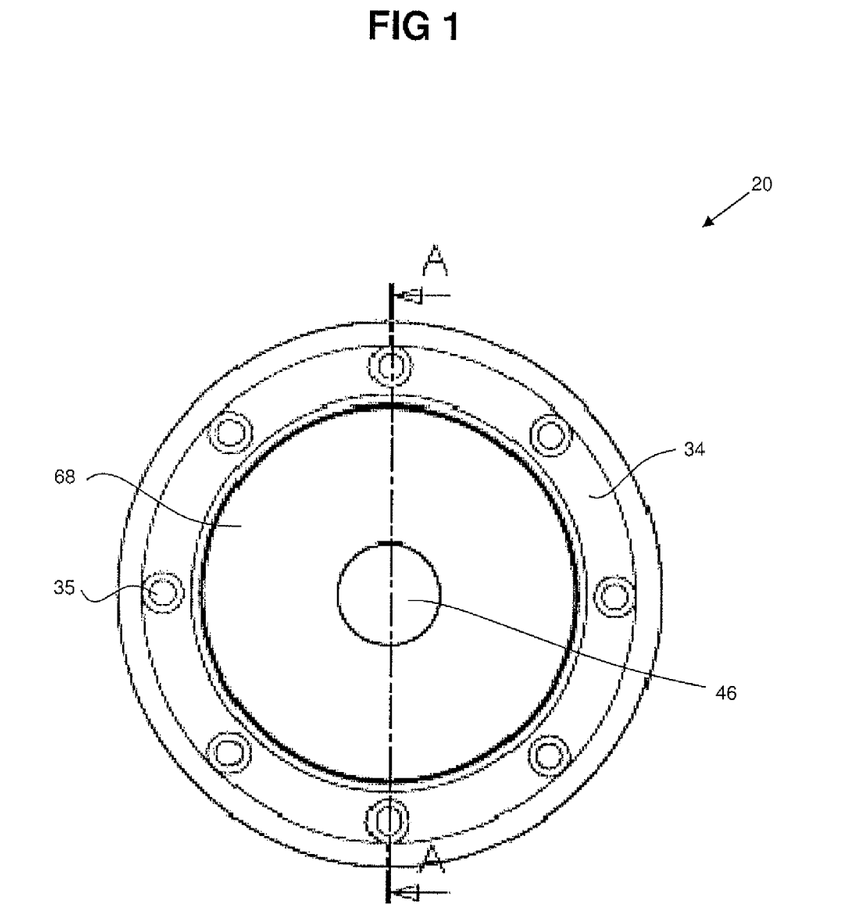
FIG. 1 is a top view of the bearing casing assembly according to one embodiment of the present invention.
Figure 2:
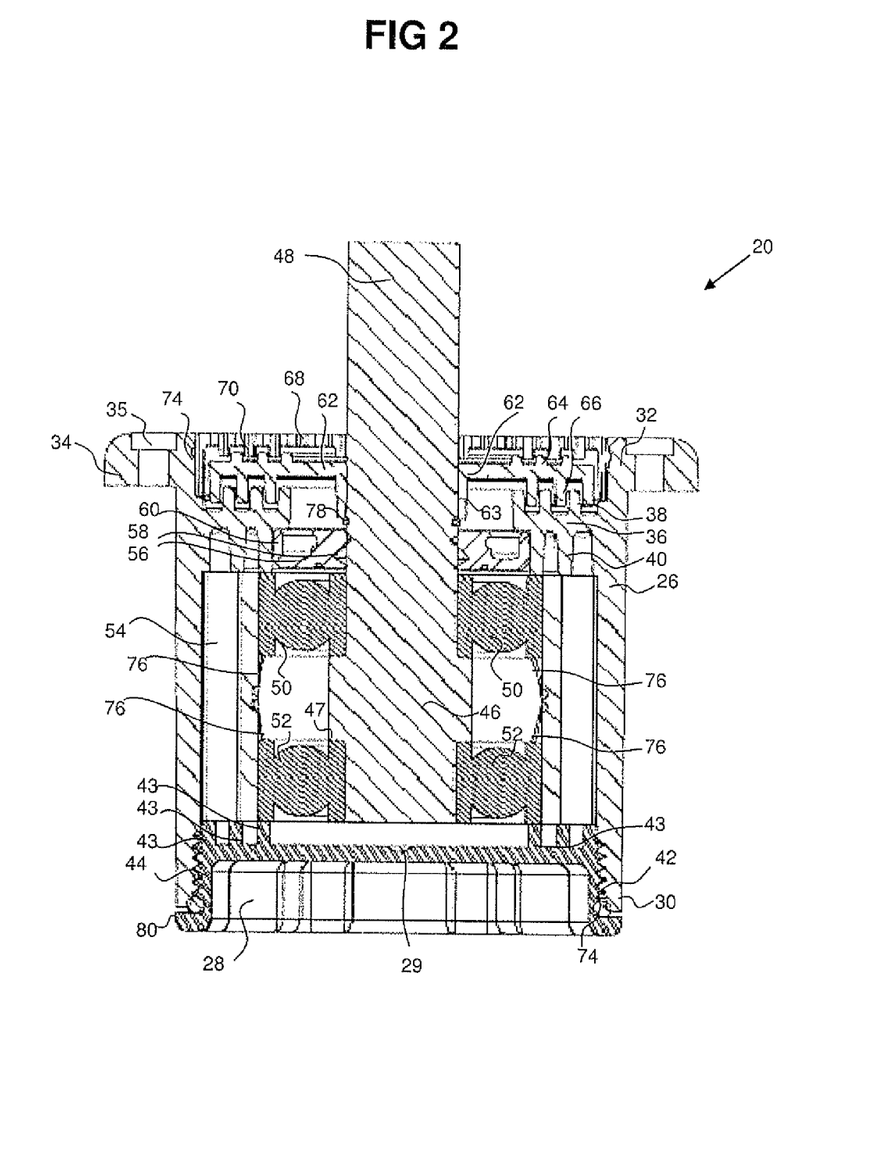
FIG. 2 is a cross-sectional view taken generally along the line A-A of the bearing casing assembly of FIG. 1.
Figure 3:
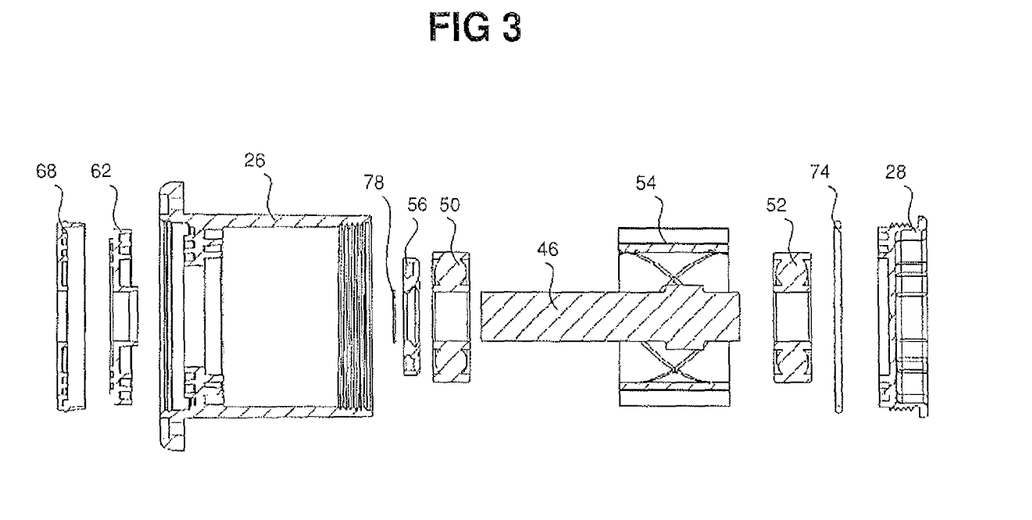
FIG. 3 is an exploded cross-sectional view of the bearing casing assembly shown in FIG. 2.
Figure 4:
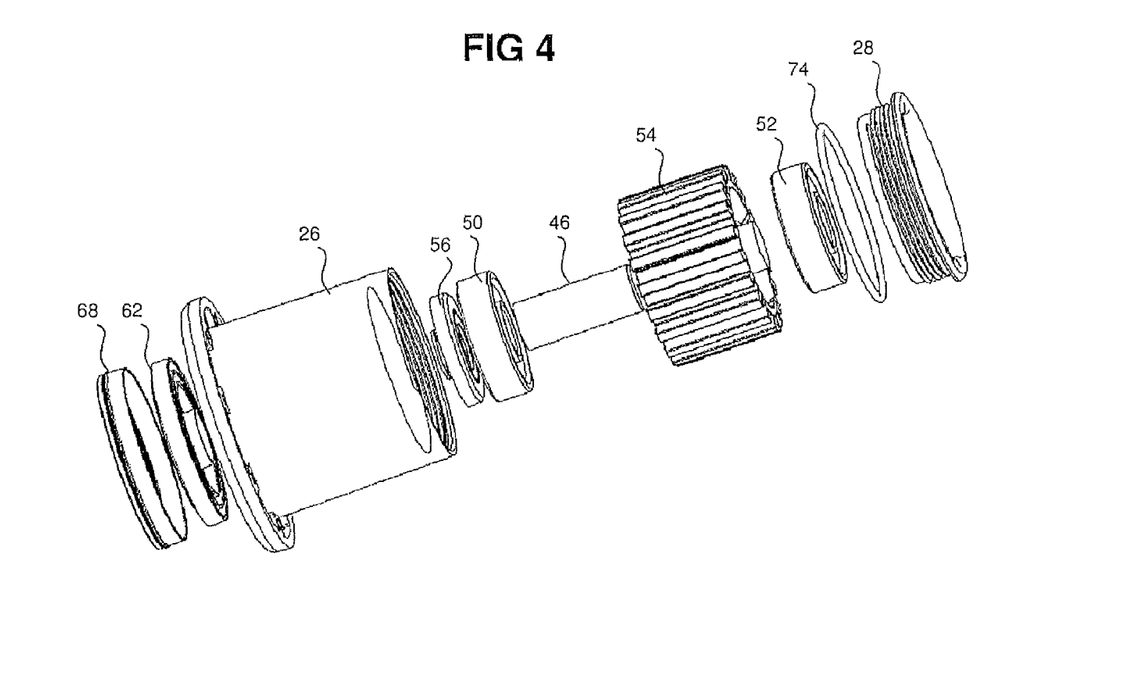
FIG. 4 is an exploded perspective view of the bearing casing assembly according to one embodiment of the present invention.
Figure 5:
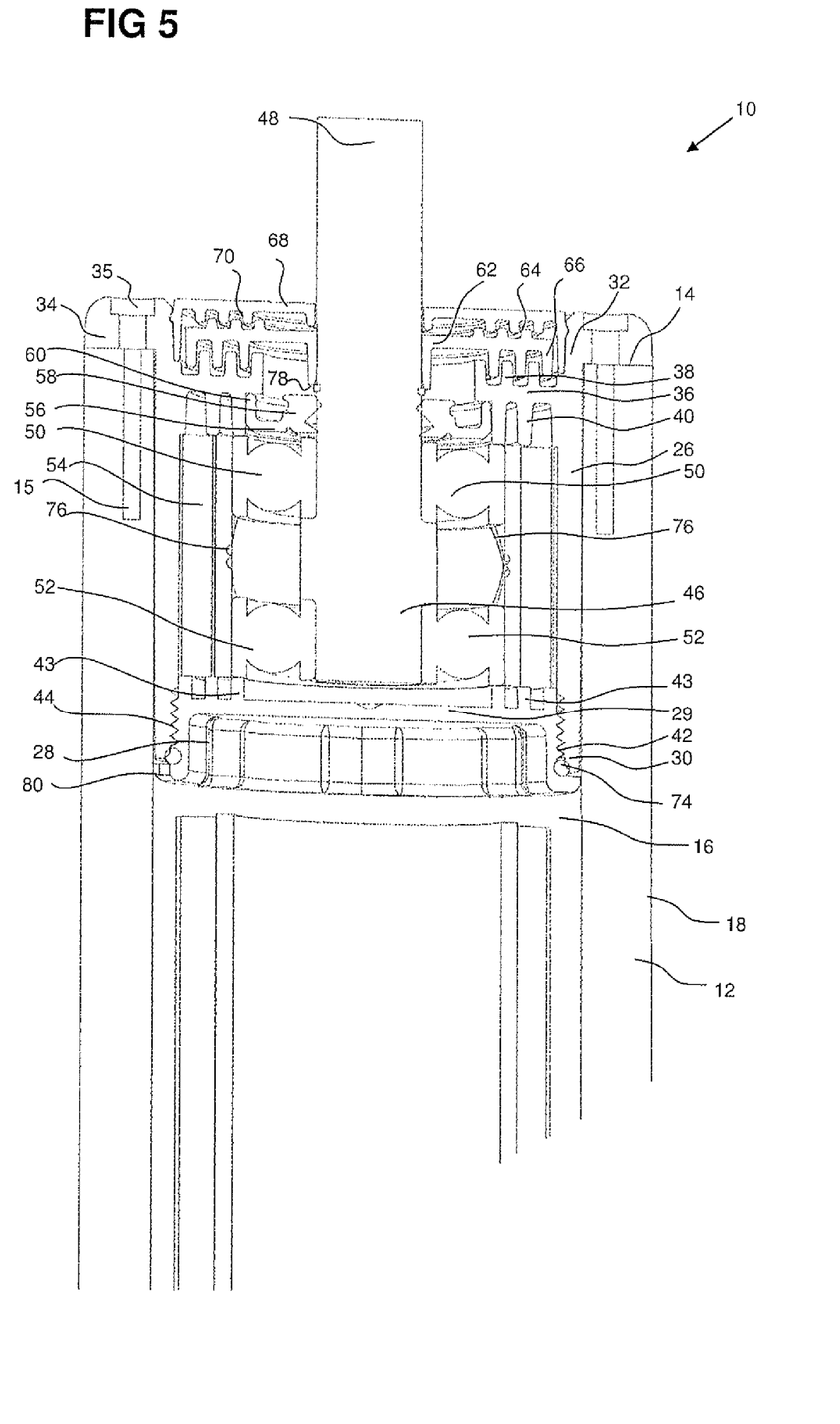
FIG. 5 is a partial cross-sectional view of the roller assembly according to one embodiment of the present invention.
Figure 7:
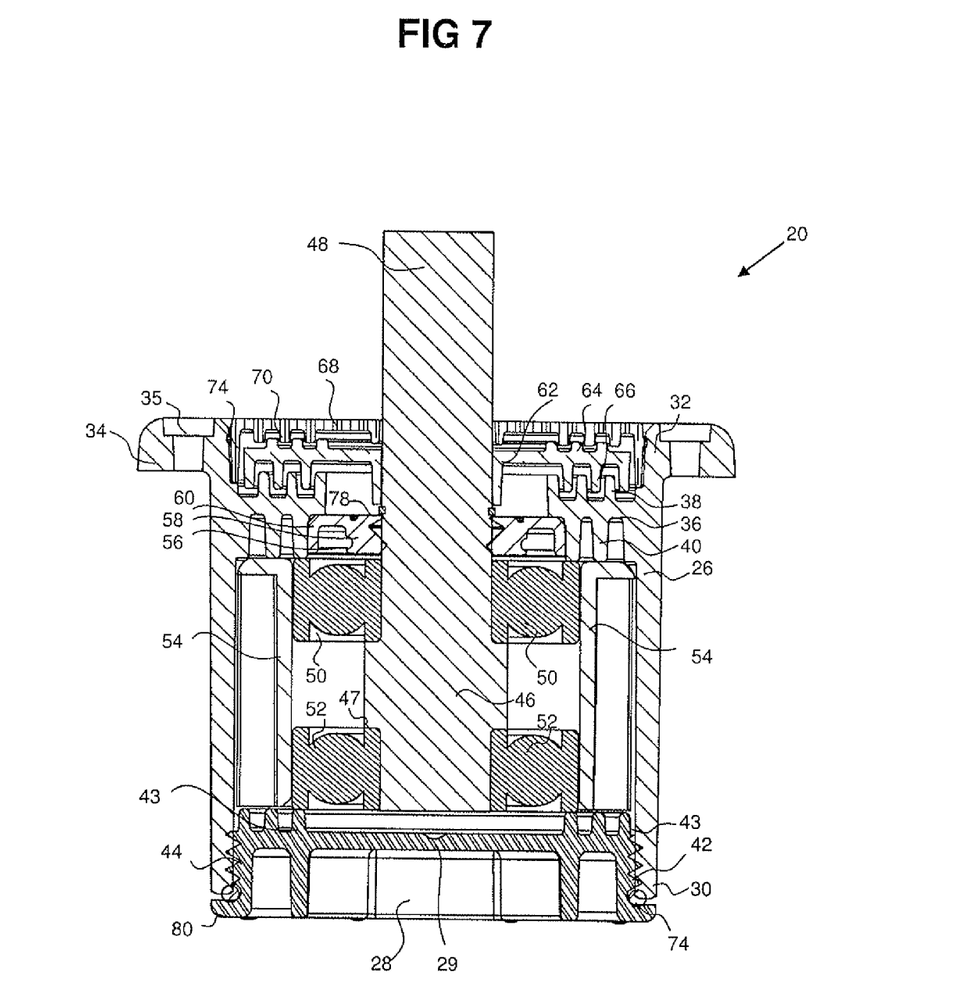
FIG. 7 is a cross-sectional view of the bearing casing assembly having an inner seal member and a bearing spacer according to one embodiment of the present invention.
Figure 8:
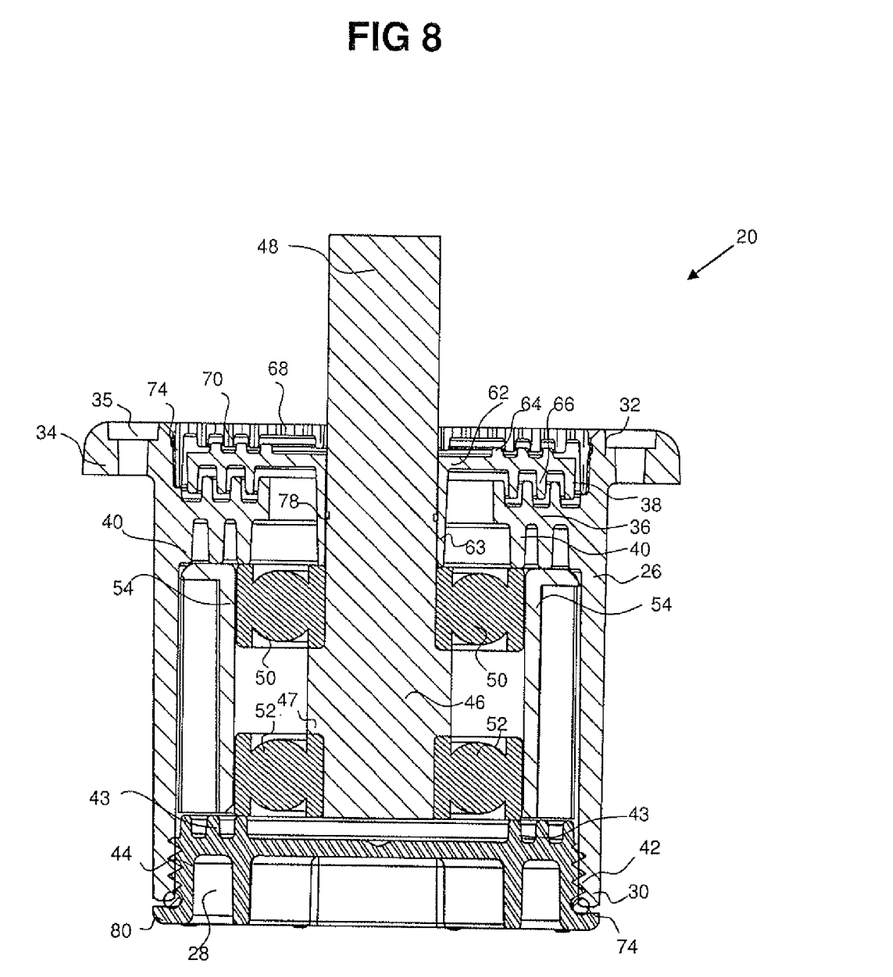
FIG. 8 is a cross-sectional view of the bearing casing assembly having a bearing spacer according to one embodiment of the present invention.
Figure 9:
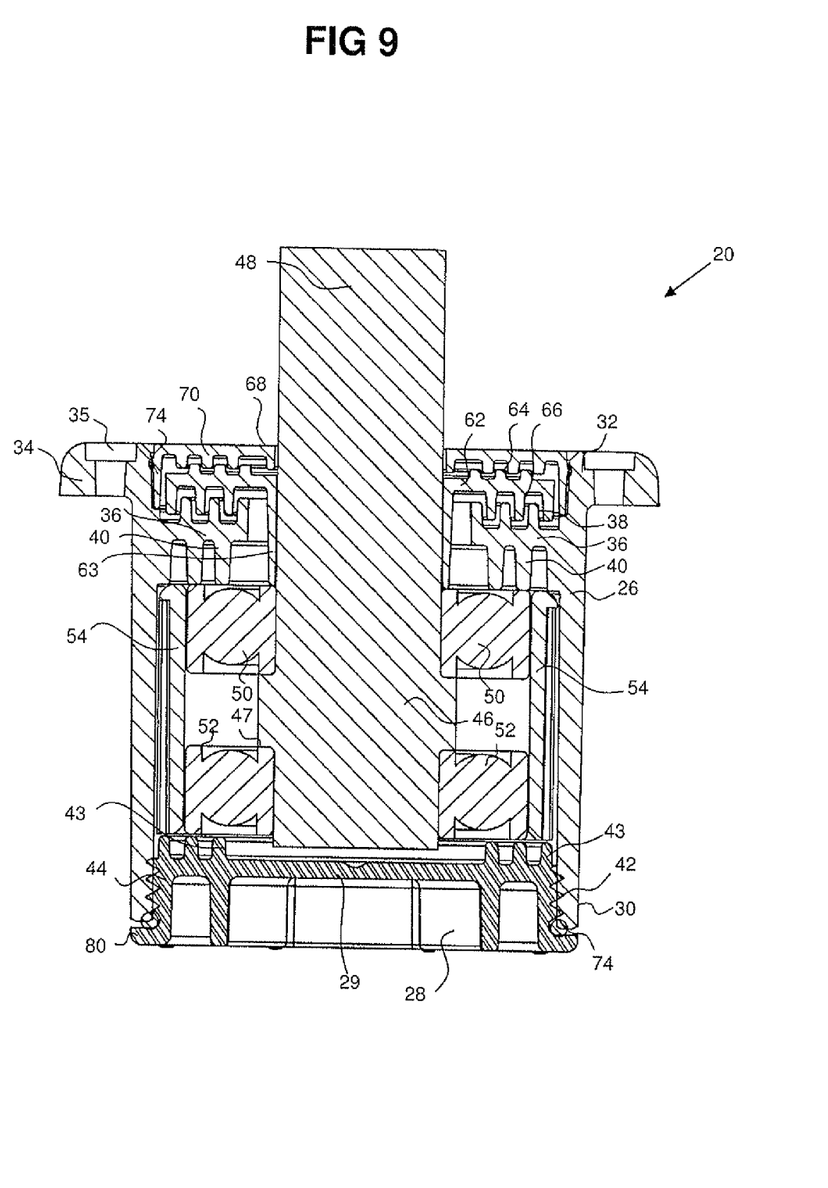
FIG. 9 is a cross-sectional view of the bearing casing assembly having a bearing spacer according to one embodiment of the present invention.

An outer seal member 62 is coupled to the axle 46 extends circumferentially and radially outward toward the casing body 26 in close proximity to the upper surface of the inner flange 36. The outer seal member 62 includes an axle seal member 63, labyrinth seal elements 64 on its upper surface and labyrinth seal elements 66 on its lower surface. The axle seal member 63 of the outer seal member 62 is preferably press fitted onto the axle 46. The length of the axle seal member 63 will vary depending on whether the bearing casing assembly 20 includes an inner seal member 56. When the bearing casing assembly 20 includes an inner seal member 56, the axle seal member 63 ends at or proximate to the upper portion of the inner seal member 56 near the axle 46 as depicted in FIGS. 2, 5 and 7. When the bearing casing assembly 20 does not include an inner seal member 56, the axle seal member 63 ends at or proximate to the upper portion of the bearing 50 as depicted in FIGS. 8 to 11.

The lower labyrinth seal elements 66 of the outer seal member 62 rotatably engage the labyrinth seal elements 38 of the upper surface of the inner flange 36, thus forming a second labyrinth seal which increases the protection to central cylindrical cavity of the casing and the bearings (50, 52) disposed therein. The labyrinth seal elements (62, 38) are axial circumferential projections. The gaps formed in the first labyrinth seal are filled with sealing means (not shown) to help reduce outside contaminants. The sealing means may be grease, gel or some combination thereof.

A retaining means 78, such as a snap ring, may be couple to the axle anterior to the outer seal member 62 to prevent axial displacement of the outer seal member 62 along the axle 46.

Inner Seal Member

Optionally, an inner seal member 56 is used when fluid lubricating bearing means are used in the bearing casing assembly 20. The inner seal member 56 provides sealing engagement of the upper portion of the central cylindrical cavity formed when the casing seat 28 is threaded into casing body 26. The inner seal member 56 includes an annular lip portion 58 having an inner circumference forming a rotary seal with the axle 46 and an outer portion 60 which rests in a recess of the inner surface of the inner flange 36.

The annular lip portion 58 includes a large annular lips and a small lip. The large annular lip may include biasing means (not shown), such as an annular spring, for urging the large diameter annular lip portion against the axle 46.

With reference to FIG. 7, the large annular lip portion is closer to the bearings (50, 52) and the small annular lip portion is closer to the outer seal member 62. In this embodiment, the function of the large annular lip is primarily to retain bearing lubricant in the central cylindrical cavity of the casing and function of the small diameter lip is primarily to protect the bearings (50, 52) from exterior contaminants. In its assembly, the casing is provided with a fluid lubricant, such as oil, in quantity sufficient to fill to a predetermined level the space between the casing seat 28, the inner seal member 56 and the bearing spacer 54 and or inside wall of the casing body 26 if no bearing spacer is required. This space constitutes a lubricant reservoir to provide long-term lubrication for the bearings.

If the bearings used in the bearing casing assembly do not require fluid lubricant within the central cylindrical cavity of the casing, the large annular lip is preferably positioned closer to the outer seal member 62, as depicted in FIG. 2, to protect the bearings (50, 52) from exterior contaminants.

Bearing Spacer

Optionally, a bearing spacer 54 is provided within the bearing casing assembly 20 for axially locating the bearings (50, 52) of smaller size with respect to the casing. Using bearing spacers allows the same casing to be used to accommodate different circumference sizes of axles. The bearing spacer 54 will also assist in axially positioning the stub axle within the conveyor roller assembly. The bearing spacer 54 has a substantially cylindrical wall having inner and outer surfaces and upper and lower edges. The inner wall surface engages the bearings, a portion of the outer wall surface engages the inner surface of the casing body 26 and the upper edge engages the circular races 40 of the flange 36. The length of the bearing spacer 54 is slightly shorter than the distance between the distal ends of the circular races 40 of the flange 36 and the circular races 43 of the casing seat 28 when the casing seat 28 is retained within the casing body 26 so that bearing spacer 54 does not interfere with the preloading of the bearings and axle. The bearing spacer 54 may also have a tapered end portion to facilitate entry of bearing spacer into the casing body 26. The bearing spacer 54 can be of different widths to accommodate different size of bearings. The inner wall surface of the bearing spacer 54 may also include helical lubrication grooves 76 to splash the lubricant within the cavity when a bearing casing assembly is under the influence of a centrifugal force and ensure that a proper amount of lubricant is supplied to the bearings so that seizure of the bearing is suppressed. The grooves 76 also ensure that the bearings (50, 52) receive an adequate supply of lubrication by guiding the lubricant to the bearings when the bearing casing assemblies 20 are being stored or transported or when a roller assembly 10 with its bearing casing assemblies 20 is at rest.

Roller Assembly

With reference to FIG. 5 there is provided a bearing casing assembly 20 fitted at an end of a roller tube 12. While only one bearing casing assembly is shown for clarity, it will be appreciated that a second bearing casing assembly (not shown) is provided at the opposite end of the roller tube 12 such that the roller tube 12 is supported at each end by a bearing casing assembly 20. A roller assembly 10 therefore comprises a pair of bearing casing assemblies 20 supported within opposite ends of a roller tube 12. The roller assemblies 10 can be rotatably mounted at opposite sidewalls of a roller conveyor (not shown) for conveying articles along the roller conveyor. It will be appreciated that by doubly supporting the roller tube 12 on two stub bearing casing assemblies 20 at each end the roller assembly 10, the weight of the roller assembly 10 is significantly reduced compared to that of a conventional roller comprising a single, solid axle extending therethrough. Moreover, by having two bearing casing assemblies 20, the roller assembly 10 can bear significantly more weight than if only one bearing casing assembly was used. The two bearing casing assemblies 20 also make it easier to ensure that the axle stub 46 is properly oriented in the roller assembly 10. They can also be individually replaced so as to avoid the necessity of replacing the entire roller assembly if one of the bearing casing assemblies deteriorates.

The roller tube 12 has an elongate tubular form comprising an outer surface 18 and an inner surface 16. The roller tube may be a tapered cylinder. The roller tube 12 may be provided in a variety of lengths and radial sizes. The roller tube 12 may be formed of a material of sufficient wall thickness so that no internal structural support is needed. The roller tube 12 may be formed from a variety of suitable plastic material such as polyurethane, high density polyethylene (HDPE), polyvinyl chloride (PVC), or ultra high molecular weight plastic (UHMW). The roller tube 12 may also be formed from fiberglass, carbon fiber, rubber, or metals such as steel, aluminum, or an alloy thereof, or any other appropriate material known in the art.

Typically, and in accordance with various industry standards and conventions, the roller tube 12 comprises an outer diameter ranging from of 2 to 8 inches, a length ranging from 7 inches to 120 inches, and a wall thickness ranging from 0.125 inches to 0.75 inches. It will be appreciated that roller tubes 12 having dimensions which fall outside of the aforementioned ranges are still within the scope of the present invention.

A bearing casing assembly 20 is securely and non-rotatably positioned at each ends of the roller tube 12 so that the roller tube 10 and casing rotate in unison. The bearing casing assembly 20 can be secured within the ends of the roller tube 12 by means of one or more of adhesives, mechanical fasteners or press fitting. A defective or used bearing casing assembly 20 can be replaced without having to replace the entire roller assembly 10. Optionally, the casing body 26 includes a shoulder 34 having a plurality of fastening apertures 35 extending longitudinally there through adapted to receive fasteners to secure the bearing casing assembly 20 to a roller tube 10. The fasteners may be, for example, screws, bolts or any other suitable fastener for coupling the bearing casing assembly 20 to the end wall 14 of the roller tube 10. In one embodiment, receiving apertures 15 corresponding to the fastening apertures 35 of the shoulder 34 are located in the end wall 14 of the roller tube 10 to facilitate the coupling of the bearing casing assembly 20 and the end wall 14 of the roller tube 10. The fastening apertures 35 and receiving apertures 15 may be of any shape conducive to receiving a fastening device therein. The fastening apertures 35 may be threaded for receiving a threaded fastener such as a screw, but it will be appreciated that the fastening apertures 35 may also be configured to receive other types of fasteners, such as bolts and the like. Suitable screws for fastening the bearing casing assembly 20 to the end wall 14 of the roller tube 10 can be made of any suitable material such as, iron, stainless steel, aluminium, plastic, zinc or brass. The screws can also be zinc plated or galvanized for a rust resistance. In one embodiment, the screws are self-threading screw such as tri-lobular, plastite or forming screws.

In one embodiment, sprocket or gear teeth assemblies are operatively coupled to the ends of the conveyor roller assembly via the fastening apertures 35 of the casing assembly 20 and receiving apertures 15 of the roller tube 10 for engaging a chain or a toothed belt coupled to a drive motor.

Figure 6:
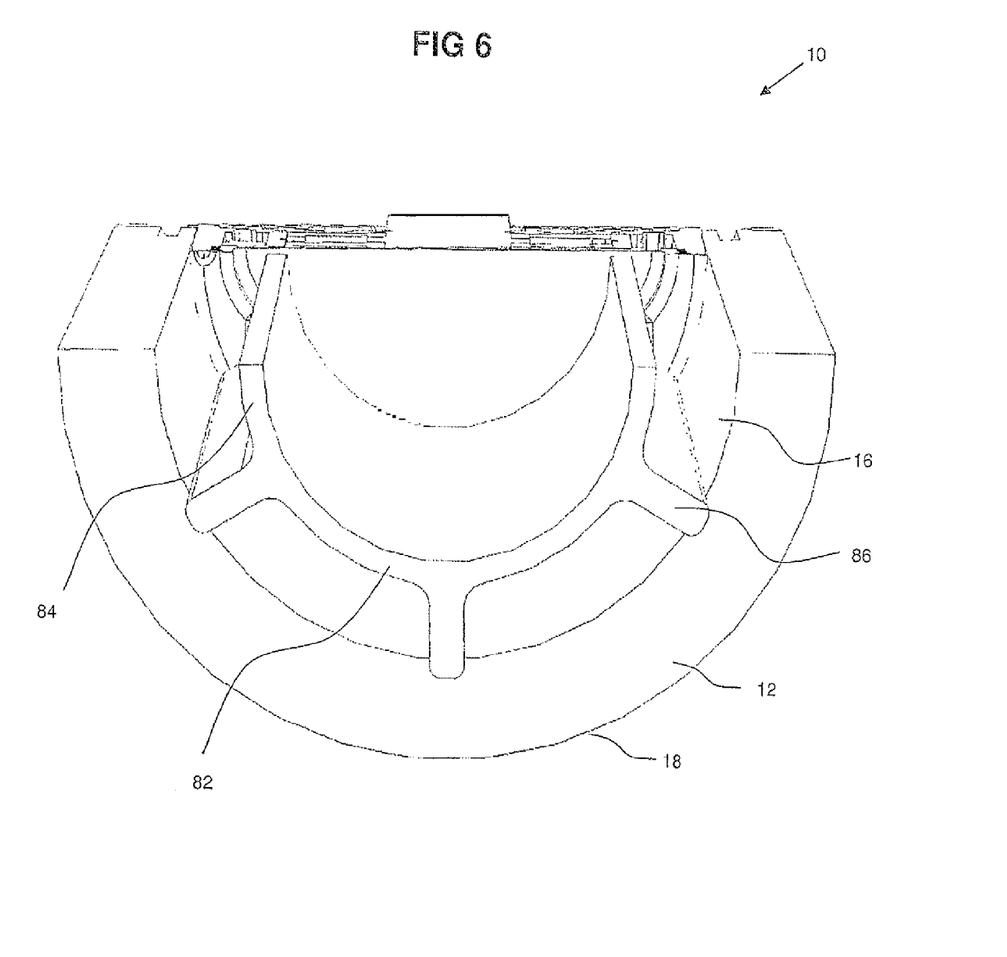
FIG. 6 is a partial cross-sectional view of the roller assembly having reinforcement means according to one embodiment of the present invention.

With reference to FIG. 6 there is optionally provided reinforcement means 82 between the bearing casing assemblies 20 secured within the ends of the roller tube 12. With longer length conveyor roller applications, the roller tubes tend to sag or bow in the middle which can dramatically decrease the capacity of the roller conveyor. The reinforcement means 12 can help the roller tube 12 resist deflection. The reinforcement means 82 includes an elongate reinforcement tube 84 concentrically disposed within the roller tube 12 having a plurality of spaced apart flanges 86 projecting substantially radially from the surface of the elongate tube 84 and resting against the inner surface 16 of the roller tube 12. The reinforcement means 82 may be formed of a variety of suitably materials such as extruded aluminum, carbon fibre and plastic.

I claim:

1. A bearing casing assembly for a conveyor roller tube comprising:

a casing adapted to be inserted at least in part into an end of a conveyor roller tube, the casing comprising a casing body and a casing seat, the casing body comprising a shoulder at the distal end of thereof extending circumferentially and radially outwardly for abutting against an end of the roller tube, an inner flange extending circumferentially and radially inwardly near the distal end from the casing body and an internally threaded proximal end, the casing seat comprising a threaded portion for threadingly engaging the threaded proximal end portion of the casing body and a bearing engaging portion adapted to abut a first bearing of a pair of bearings for selectively adjusting a preload on the pair of bearings and a stub axle by rotating the casing seat about the casing body, the stub axle positioned within the casing and comprising a tip projecting outwardly from the casing, the pair of bearings mounted in a spaced apart relationship on the axle such that the axle is rotatable with respect to the casing, an outer seal member coupled to the axle extending circumferentially and radially outward toward the casing body, the outer seal member comprising labyrinth seal elements on the upper and lower surfaces thereof, the lower labyrinth seal elements of the outer seal member rotatably engaging labyrinth seal elements of the upper surface of the inner flange to form a lower labyrinth seal, a shield cap adapted to be coupled to the inner surface of the casing body at the distal end thereof, the shield cap comprising labyrinth seal elements to engage the upper surface of the outer seal member to form an upper labyrinth seal.

2. The bearing casing assembly of claim 1, further comprising an inner seal member positioned between the axle and the lower surface of the inner flange of the casing body adapted to retain bearing lubricant in the central cylindrical cavity of the casing and to protect the bearings from exterior contaminants.

3. The bearing casing assembly of claim 2, wherein the inner seal member comprises a biasing means for urging the inner seal member against the axle.

4. The bearing casing assembly of claim 2, wherein the inner seal member comprises a first annular lip adapted to retain bearing lubricant in the central cylindrical cavity of the casing and a second lip adapted to protect the central cylindrical cavity from exterior contaminants.

5. The bearing casing assembly of claim 4, wherein the first annular lip has a larger diameter than the second lip.

6. The bearing casing assembly of claim 4, wherein the first annular lip is proximate to the bearings and the second annular lip is proximate to the outer seal member.

7. The bearing casing assembly of claim 2, wherein the central cylindrical cavity of the casing comprises lubricant.

8. The bearing casing assembly of claim 1, wherein the shoulder of the casing body comprises a width substantially equal to a wall of a roller tube.

9. The bearing casing assembly of claim 1, wherein the shoulder of the casing body comprises a plurality of apertures adapted to receive fasteners to secure the casing to end wall of the roller tube.

10. The bearing casing assembly of claim 1, wherein the inner flange of the casing body comprises labyrinth seal elements extending from the upper surface of the inner flange for rotatably engaging the lower labyrinth seal elements of the outer seal member and one or more circular races on its lower surface configured to abut against a bearing or a bearing spacer.

11. The bearing casing assembly of claim 1, further comprising a bearing spacer for axially locating the bearing with respect to the casing.

12. The bearing casing assembly of claim 11, wherein the bearing spacer comprises a substantially cylindrical wall adapted to engage the bearings, the inner surface of the casing body and the races of the inner flange of the casing body.

13. The bearing casing assembly of claim 11, wherein the bearing spacer comprises a length that is slightly shorter than the distance between the distal ends of the circular races of the inner flange and the circular races of the casing seat when retained within the casing body.

14. The bearing casing assembly of claim 1, wherein the bearings are press fitted on the axle.

15. The bearing casing assembly of claim 1, wherein the outer seal member is press fitted on the axle.

16. The bearing casing assembly of claim 1, wherein the bearing spacer is press fitted with the casing body.

17. The bearing casing assembly of claim 1, wherein the casing body comprises a threaded outer portion adapted to be received within an internally threaded portion of an end of roller tube.

18. A roller assembly comprising a roller tube and a pair of bearing casing assemblies according to claim 1 rotationally supported within opposite ends of the roller tube.

19. The roller assembly of claim 18, wherein the bearing casing assemblies are press fitted within the ends of the roller tube.

20. The roller assembly of claim 18, wherein the shoulder of the casing body of the bearing casing assemblies comprises a plurality of apertures adapted to receive means of securing the casing to end wall of the roller tube.

21. The roller assembly of claim 18, wherein the roller tube comprises ends walls having apertures corresponding to the apertures in the shoulder of casing body for receiving securing means.

22. The roller assembly of claim 18, further comprising a sealing means between an inner wall of the roller tube and outer surface of the casing bodies of the bearing casing assemblies.

23. The roller assembly of claim 18, further comprising reinforcement means within the roller tube between the bearing casing assemblies secured within the ends of the roller tube.

24. The roller assembly of claim 23, wherein the reinforcement means comprises an elongate reinforcement tube concentrically disposed within the roller tube having a plurality of spaced apart flanges projecting substantially radially from the surface of the elongate tube and resting against the inner surface of the roller tube.

25. The roller assembly of claim 23, wherein the reinforcement means is made of aluminum.

* * * * *